(12) United States Patent
Blake et al.

(10) Patent No.: US 7,111,130 B2
(45) Date of Patent: Sep. 19, 2006

(54) COHERENCY MANAGEMENT FOR A "SWITCHLESS" DISTRIBUTED SHARED MEMORY COMPUTER SYSTEM

(75) Inventors: Michael A. Blake, Wappingers Falls, NY (US); Pak-kin Mak, Poughkeepsie, NY (US); Adrian E. Seigler, Poughkeepsie, NY (US); Gary A. VanHuben, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/402,599

(22) Filed: Apr. 12, 2006

(65) Prior Publication Data

US 2006/0184750 A1 Aug. 17, 2006

Related U.S. Application Data

(63) Continuation of application No. 10/435,776, filed on May 12, 2003.

(51) Int. Cl.
G06F 12/00 (2006.01)

(52) U.S. Cl. .................................... 711/147
(58) Field of Classification Search ............ None
See application file for complete search history.

(56) References Cited

U.S. PATENT DOCUMENTS

| | | | |
|---|---|---|---|
| 5,297,269 A | 3/1994 | Donaldson et al. | |
| 5,577,204 A * | 11/1996 | Brewer et al. | 710/317 |
| 5,673,413 A | 9/1997 | Deshpande et al. | |
| 5,878,268 A | 3/1999 | Hagersten | |
| 5,940,856 A | 8/1999 | Arimilli et al. | |
| 5,940,864 A | 8/1999 | Arimilli et al. | |
| 5,943,684 A | 8/1999 | Arimilli et al. | |
| 5,943,685 A | 8/1999 | Arimilli et al. | |
| 6,006,255 A | 12/1999 | Hoover et al. | |
| 6,018,791 A | 1/2000 | Arimilli et al. | |
| 6,115,804 A | 9/2000 | Carpenter et al. | |
| 6,253,292 B1 | 6/2001 | Jhang et al. | |
| 6,385,676 B1 * | 5/2002 | Adkisson | 710/100 |
| 6,611,906 B1 | 8/2003 | McAllister et al. | |
| 6,718,375 B1 * | 4/2004 | Hornung et al. | 709/223 |

\* cited by examiner

*Primary Examiner*—Mano Padmanabhan
*Assistant Examiner*—Duc T Doan
(74) *Attorney, Agent, or Firm*—Lynn Augspurger; Cantor Colburn LLP

(57) ABSTRACT

A shared memory symmetrical processing system including a plurality of nodes each having a system control element for routing internodal communications. A first ring and a second ring interconnect the plurality of nodes, wherein data in said first ring flows in opposite directions with respect to said second ring. A receiver receives a plurality of incoming messages via the first or second ring and merges a plurality of incoming message responses with a local outgoing message response to provide a merged response. Each of the plurality of nodes includes any combination of the following: at least one processor, cache memory, a plurality of I/O adapters, and main memory. The system control element includes a plurality of controllers for maintaining coherency in the system.

5 Claims, 19 Drawing Sheets

CACHE OWNERSHIP STATES

| |
|---|
| INVALID |
| MC 1, IM=0, READ ONLY TO 1 CP |
| MC 1, IM=1, READ ONLY TO 1 CP, CHANGED |
| MC 1, IM=1, READ ONLY TO 1 CP, UNCHANGED |
| MC 1, IM=0, READ ONLY TO ALL CPS |
| MC 1, IM=1, READ ONLY TO ALL CPS, CHANGED |
| MC 1, IM=1, READ ONLY TO ALL CPS, UNCHANGED |
| MC 0, IM=1, READ ONLY TO 1 CP, CHANGED |
| MC 0, IM=1, READ ONLY TO 1 CP, UNCHANGED |
| MC 0, IM=1, READ ONLY TO ALL CPS, CHANGED |
| MC 0, IM=1, READ ONLY TO ALL CPS, UNCHANGED |
| MC 0, IM=1, EXCLUSIVE TO 1 CP, CHANGED |
| MC 0, IM=1, EXCLUSIVE TO 1 CP, UNCHANGED |
| MC 0, IM=1, UNOWNED BY CPS, CHANGED |
| MC 0, IM=1, UNOWNED BY CPS, UNCHANGED |

| OPERATIONAL RESPONSES | DEFINITION |
|---|---|
| NO STATUS | |
| MISS | |
| IM HIT | |
| INTERMEDIATE IM CAST OUT | |
| READ ONLY HIT | |
| MEMORY DATA | |
| IM REJECT | |
| MM REJECT | |
| NORMAL COMPLETION | |

| ORDER | RESPONSE COHERENCY ORDERING | |
|---|---|---|
| | RESPONSE | |
| 1. | IM HIT | |
| 2. | IM REJECT | |
| 3. | MM REJECT | |
| 4. | MEMORY DATA | |
| 5. | RO HIT | |
| 6. | NORMAL COMPLETION | |
| 7. | MISS | |
| 8. | NO STATUS | |

| COMMAND | DESCRIPTION |
|---|---|
| READ ONLY FETCH | CP INSTRUCTION FETCH |
| EXCLUSIVE FETCH | CP D-CACHE FETCH |
| READ ONLY INVALIDATE | ACQUIRE EXCLUSIVE OWNERSHIP OF READ ONLY DATA RESIDING IN TOP LEVEL CACHE |
| LRU WRITE BACK | REMOVAL OF AGED DATA FROM CACHE |

OPERATIONAL COMMANDS

PRIORITY OF RING REQUESTS

| PRIORITY | RING REQUEST TYPE |
|---|---|
| 1 | DATA FLOW THRU OPS |
| 2 | REMOTE DATA REQUESTS |
| 3 | LOCAL DATA REQUESTS |
| 4 | LOCAL NON-DATA REQUESTS |
| 5 | FIRST MESSAGE REMOTE REQUESTS |
| 6 | SECOND MESSAGE REMOTE REQUESTS |

FIG. 7

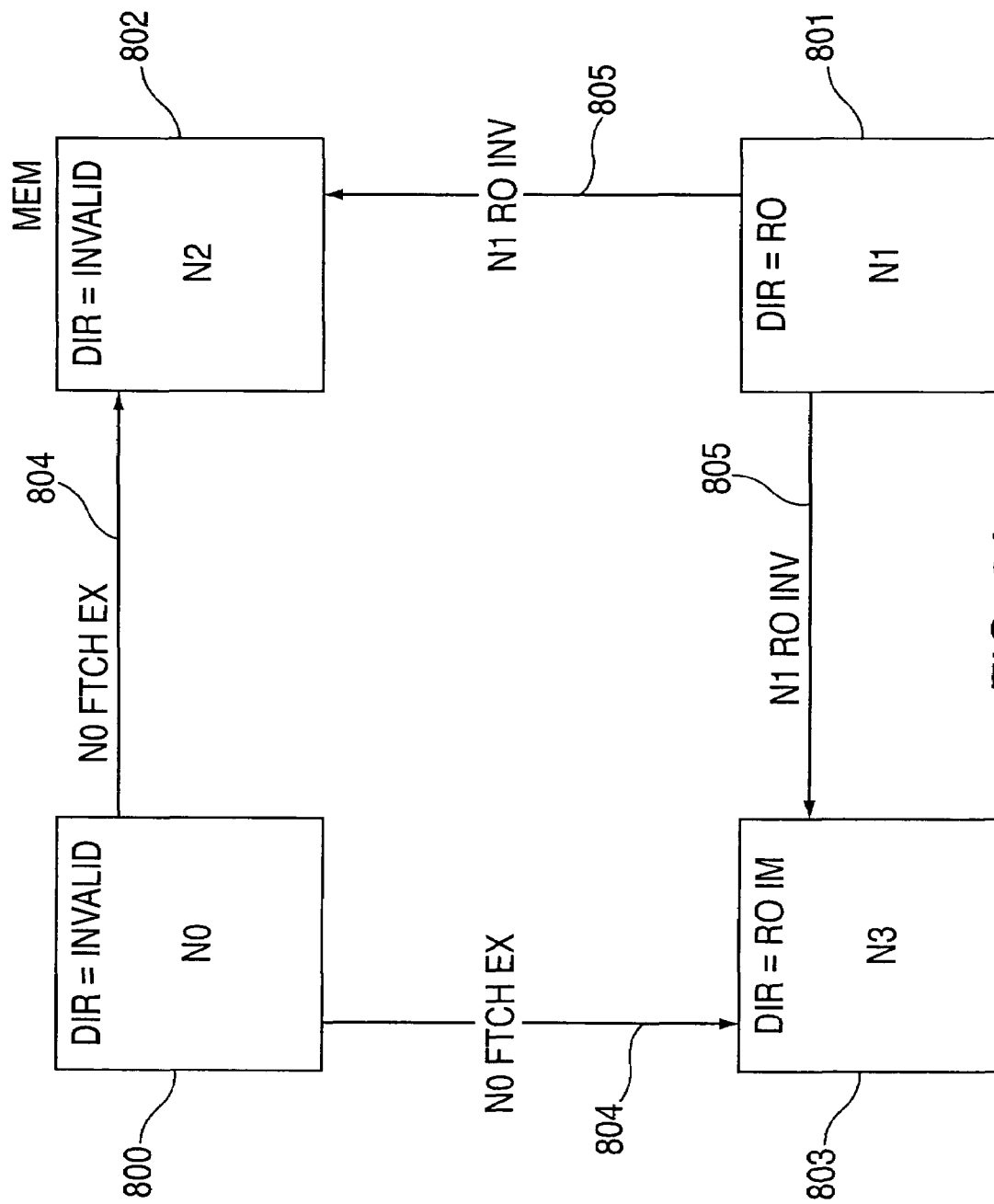

COHERENCY MANAGEMENT FOR A "SWITCHLESS" DISTRIBUTED SHARED MEMORY COMPUTER SYSTEM

CROSS REFERENCE TO RELATED APPLICATIONS

This application is a continuation of U.S. patent application Ser. No. 10/435,776 filed May 12, 2003, the continents of which are incorporated by reference herein in their entirety.

This application is related to U.S. patent application Ser. No. 10/435,878 filed May 12, 2003, entitled: BUS PROTOCOL FOR A "SWITCHLESS" DISTRIBUTED SHARED MEMORY COMPUTER SYSTEM which is now U.S. Pat. No. 6,988,173 issued Jan. 17, 2006.

This application is also related to U.S. patent application Ser. No. 10/436,378 filed May 12, 2003, entitled: TOPOLOGY FOR SHARED MEMORY COMPUTER SYSTEM.

These co-pending applications and the present application are owned by one and the same assignee, International Business Machines Corporation of Armonk, N.Y.

The descriptions set forth in these co-pending applications are hereby incorporated into the present application by this reference.

Trademarks: IBM® is a registered trademark of International Business Machines Corporation, Armonk, N.Y., U.S.A. Other names may be registered trademarks or product names of International Business Machines Corporation or other companies.

TECHNICAL FIELD

The invention relates to large shared-memory symmetrical multiprocessing computer systems built from multiple building blocks, henceforth referred to as "nodes", each of which contains some amount of memory and some number of processing units. More particularly, an exemplary embodiment of the present invention is related to the storage coherency management on a nodal interconnect topology that allows for both high overall system performance and availability.

BACKGROUND

The continued demand for high performance computers and/or computer systems requires optimum usage of the available hardware and software. One such approach is the implementation of the use of processing nodes each comprising one or more microprocessors and memories. These computer systems are sometimes referred to shared multiprocessor systems. In a shared multiprocessing computer system, the nodes are interconnected to each other so that they can communicate with each other, share operating systems, resources, data, memory etc.

One of the goals of building a modem computing machine employed at the Enterprise level include having enough system capacity to take the many different workloads and applications running in a distributed computing environment such as a server farm and migrate them onto a large monolithic host server. The benefit of consolidating workloads and applications from many small machines to a larger single one is financially motivated to reduce the number of system operators, amount of floorspace and system maintenance costs. System integration vendors have been pushing the SMP size envelope, integrating up to 64 or more processors in a tightly coupled shared memory system in a variety of coherent inter-processor connect topologies.

The commonly available designs in the Unix platform include topologies where integrated processor-memory nodes, or simply nodes, are interconnected by means of multiple parallel common directional loops with distributed switch network (topology A), Central crossbar switch (topology B), or tree-based hierarchical switch (topology C). All of the above-mentioned topologies can be built to achieve the large scalability goal of a modem computing machine, but at the expense of incurring lengthy node to node access latency times, as measured in the number of node hops, adversely affecting system performance.

When a processor demands a unit of storage data which is not present in its node's internal cache system the data request is broadcast out to snoop all other nodes in the system to locate the latest version of the data. This data request, or address broadcast snoop, traverses the entire topology to find every node and snoop their cache content for an address match. The collective snoop results are then combined and are acted upon as an arbitration means by which the appropriate node is selected to source the data. A storage coherency scheme can be devised that will source data early from a node without waiting upon the collective snoop results. If the same data exists in multiple nodes' caches only one node would source the requested data.

Upon implementing the described sequence for processing a data fetch request on a 4-node system as an example, the address snoop on topology A propagates around a ring snooping every node in the process and eventually circles back on the requesting node. The snoop results from each of the node are gathered back on the requesting node and then broadcast out on the ring to identify which node will source the data.

Again, a storage coherency scheme can be devised where data existing in a node's cache can be sourced on the initial snoop broadcast without needing to wait for the collective snoop result broadcast. The access latency on topology A for the early data case from snoop launch, assuming data routing is optimized for the shortest return path, is an average of 3.33 node to node crossings or node hops. For the late data case which relies on the collective snoop results the average latency is 7.33 node hops.

In topology B, the fetch request is launched to the central crossbar switch and from there it is broadcast to the other 3 nodes. The snoop results from the nodes are then collected on the central crossbar switch and broadcast out to the all nodes. The calculated average early data latency in topology B is therefore 4 node hops treating the node to central crossbar switch crossing as a node hop, and the average late data latency is 6 node hops.

In a tree based hierarchical topology such as in topology C with 4 nodes, optimally the topology would appear similar to topology B and therefore would have the same latency. A taller tree based hierarchy would lengthen the early and late data latencies by 2 node hops for each switch level that is added.

Accordingly, it is desirable to provide storage coherency management on a nodal interconnect topology that allows for both high overall system performance and availability.

SUMMARY

Exemplary embodiments disclosed herein describe bus protocol and storage coherency management methods for a system topology comprised of multiple nodes having any combination of processors, I/O adapters, main memory and the system switch network distributed across as many pluggable nodes as desired.

Interconnecting the nodes together is a pair of coherent ring busses flowing in opposite directions providing to each node redundant paths for inter-processor communication. Within each node there exists a System Controller which consists of an integrated switch with a top level cache, various controllers, and discrete interfaces (or ports) to every Processor, I/O adapter, and the main memory.

The inter-processor communication flow in dual ring topology can occur on either of the two rings or on both. Each ring comprises dedicated pathways for coherency traffic and for storage data, and the two pathways are decoupled from each other permitting simultaneously different system operations within the same ring. Coherency traffic, or snoop addresses, generally need to be broadcast to all other nodes and in an exemplary embodiment snoop addresses are broadcast on both rings simultaneously to reduce data intervention latency times. However, storage data would only need to be returned on one of the rings.

The bus protocol set provides methods to efficiently package the various protocol constructs into a ring message so as to minimize overall coherency bus utilizations and to fit onto a small bus interface by combining the snoop command/address along with snoop responses that get ordered as the message passes through the nodes.

Also, a method is disclosed for situations when two messages have arrived at each downstream node whereby the two incoming responses are merged with the receiving node's own response to individually calculate the final response without the need to centrally collect all the snoop responses at a predetermined place on the system and then broadcast the results as another bus packet on the dual ring network.

Furthermore, when the second message arrives at a node the message does not require snooping since it was already performed with the first message and therefore the second message eliminates the address information before the second message packet exits the node to reduce coherency bus utilizations.

Storage coherency management is designed to maintain data integrity in a multiprocessor system where a plurality of the processors can simultaneously request for data.

The methods and apparatus disclosed herein also utilize a dual token based scheme where the presence of one token will override the coherency measures of the other token. These dual tokens, one that is cache based and the other memory based, act as system level coherency points and exist for each cacheable data unit from storage thus permitting parallel non-contending accesses. In the event multiple processors contend for the same cache data unit the access request which acquires the cache token proceeds while the other processors' access request are stalled until the receipt of data. In the absence of an existing cache token, implying the requested storage data is not to be cache sourced, the access request which acquires the memory token proceeds while the other processors' access request are stalled until the receipt of data.

Exemplary embodiments of the present invention also describe methods to avoid common hardware hazards that can be encountered at anytime during the processing of the data request starting from the time each token is being acquired to the safe passage of the returning data.

An exemplary embodiment provides methods to avoid hardware hazards that can be encountered at anytime during the processing of a data request starting from the time each token is being acquired to the safe passage of the returning data.

These and other embodiments are described in the following detailed description, which refer to the drawings.

DESCRIPTION OF THE DRAWINGS

FIG. 2 illustrates a table of cache states that data may exist in. This table further depicts how Intervention Master (IM) and Multi-Copy (MC) states are used in conjunction with more traditional cache states to achieve overall coherency.

FIG. 3A illustrates a table listing the responses conveyed by the protocol of the exemplary embodiment for various bus operations.

FIG. 3B illustrates the priority table utilized by the present invention to order merged responses prior to outgating them onto the Ring topology.

FIG. 6 illustrates the list of bus operational commands which employ the bus protocol and cache coherency methods in an exemplary embodiment.

FIG. 7 illustrates the table used to determine the order of priority for launching new bus operations out onto the Ring topology in cases where a plurality of requests contend for the same interface.

FIGS. 8A thru 8E illustrate an example of sequencing for concurrent fetch operations vying for the same data. These figures shows how the various coherency and protocol methods result in one bus operation completing successfully, with the other being rejected.

The detailed description explains exemplary embodiments of the invention, together with advantages and features, by way of example with reference to the drawings.

DETAILED DESCRIPTION

Referring now to the Figures and in accordance with an exemplary embodiment of the present invention, a large shared-memory symmetrical multiprocessing computer system built from multiple building blocks, henceforth referred to as "nodes", each of which contains some amount of memory and some number of processing units is illustrated. In accordance with an exemplary embodiment, the system structure comprises four nodes interconnected via a dual concentric ring topology for illustrative purposes. Of course, it is contemplated that systems comprising more or less than four nodes may be used with the embodiments disclosed herein.

Figure 1A:
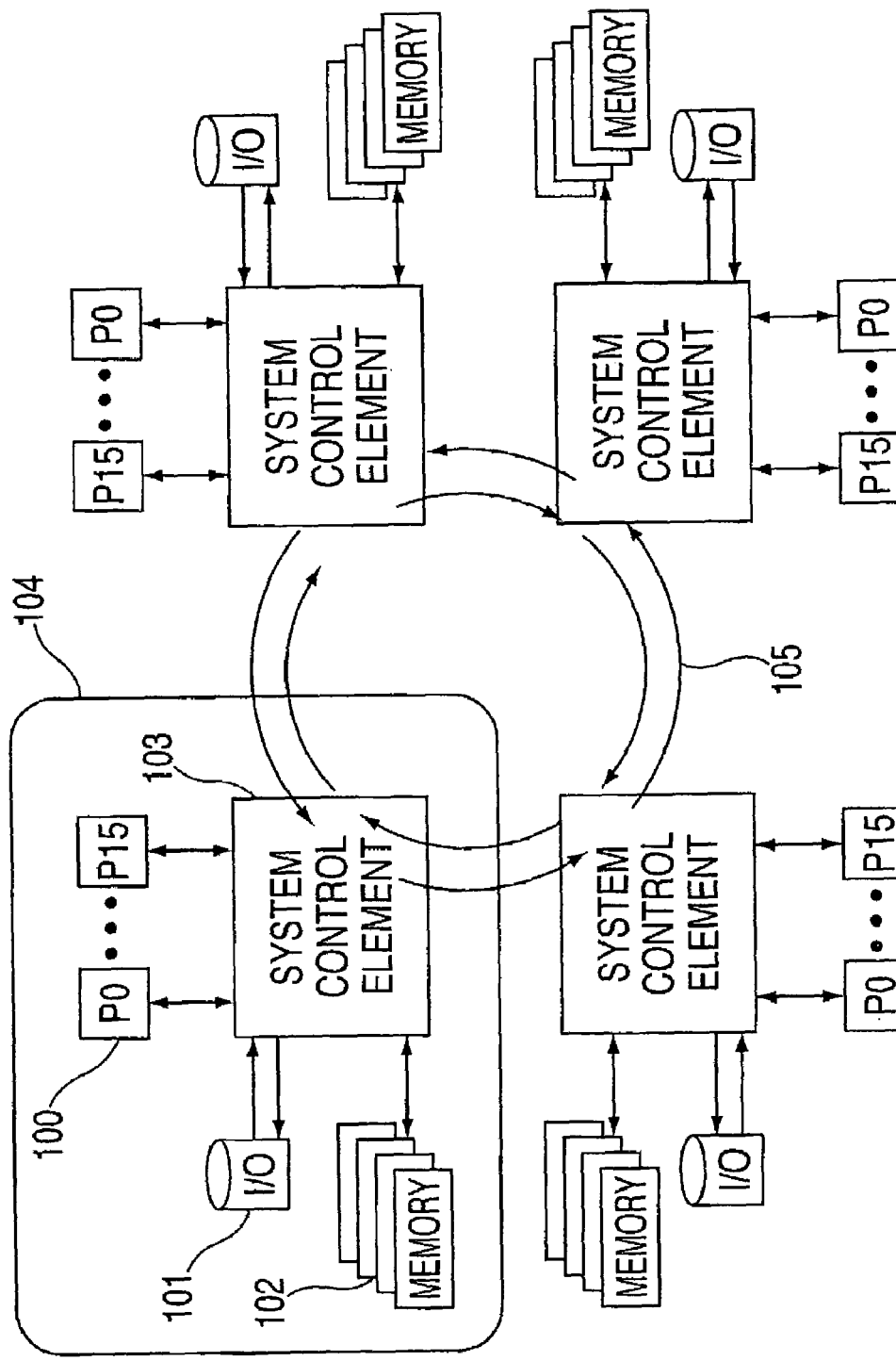
FIG. 1A illustrates the overall structure of a multi-nodal computer system comprising System Control Element (SCE), Central Processors (CP), I/O adapters, and Main Memory wherein each node is connected by a Ring topology.

FIG. 1a depicts an example of four nodes (104) in a multi-nodal symmetric multiprocessing system. Each node (104) comprises a System Controller Element (103) which provides interconnections and communications with a plurality of central processors (100), I/O adapters (101), and main memory (102) of the node it is resident upon and the other nodes via other system controllers elements on the other nodes and a pair of rings for providing communication links between the nodes.

The System Controller Element (103) contains top-level cache which serves as the central coherency point within that particular node. Both the top-level cache and the main memory are accessible by a central processor or I/O adapter within that node (104) or any of the remaining three nodes in the system. Data fetch and store requests are initiated by the central processors or I/O adapters, and are processed by the local controllers contained within the SCE (103).

Fetch requests from a central processor which miss the top-level cache within a node will interrogate the top-level caches on the other nodes. If the fetch operation misses the top-level caches on all nodes, then the target node where the main memory address resides serves as the source for the data. For LRU Writeback operations resulting from aged out cache data, the data is transferred directly to the target node without the need for interrogation.

The command/address portion of all ring operations destined for other nodes are launched onto both rings simultaneously. For matters of system level coherency, both operations must pass through each node and the results of the requested operations are merged to provide a final response to the requesting node.

As the operation passes through each remote node, remote fetch controllers interrogate the top-level cache on that remote node and perform any necessary system coherency actions. In the event the desired data is located in one of the remote caches, the data fetch operation is handled by remote fetch controllers resident upon the node having the desired data. Finally, if the operation misses all the caches (local and remote) and targets memory on a remote node, the data fetch operation is handled by the remote fetch controller on the node in which the target memory resides.

The system's main memory is distributed across the nodes. On each node there exists a set of hardware mapping registers which takes the address portion of the operation and determines if the main memory location exists on that node.

For LRU Writeback operations passing thru each remote node, there exists a set of remote store controllers. On intermediate nodes (nodes which are neither the source or destination of data) the remote store controllers serve to propagate the operation to the next node. On the target memory node, the remote store controller no longer forwards the operation, but puts the data away in main memory and returns a completion response.

Figure 1B:
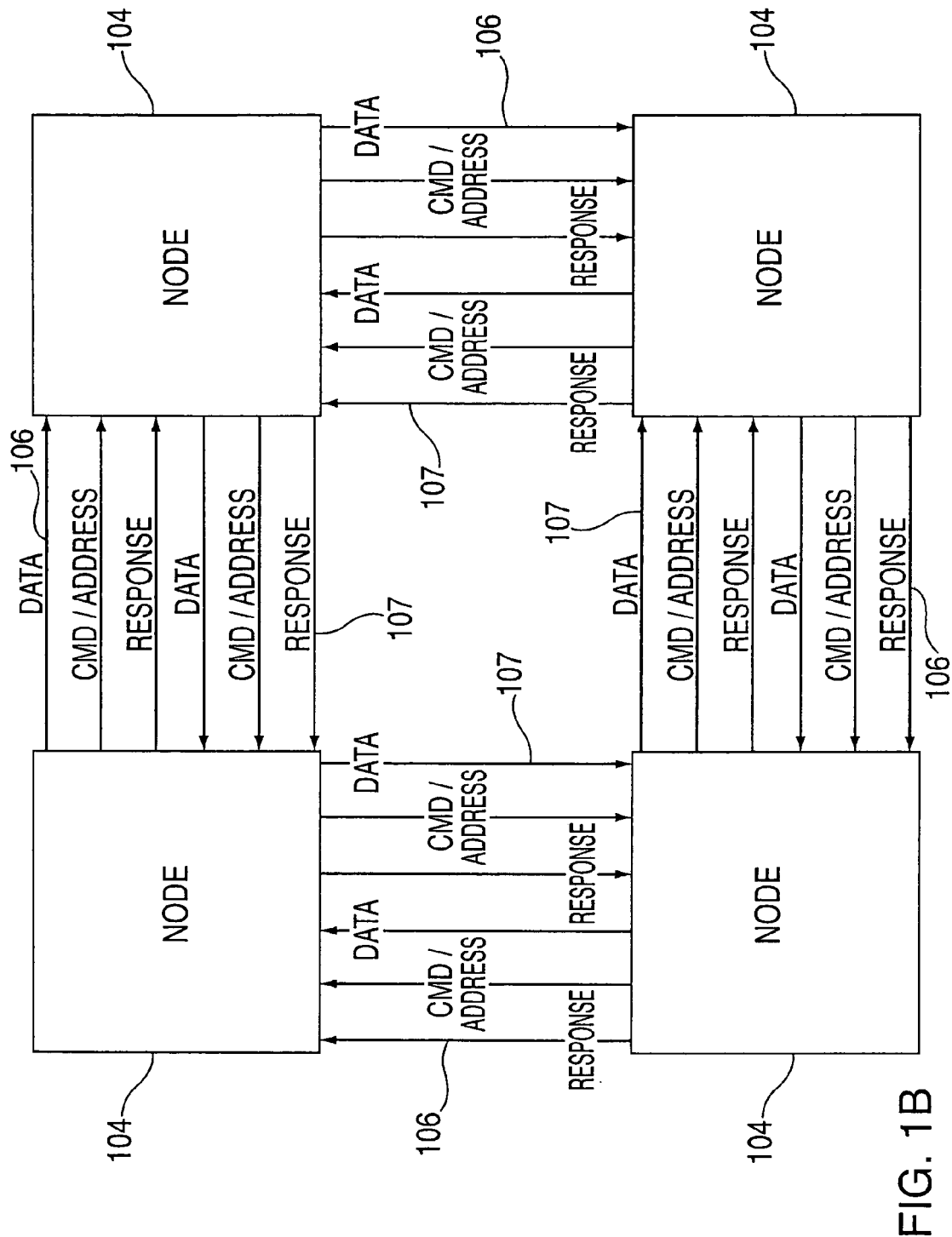
FIG. 1B illustrates the detailed Ring topology of the exemplary embodiment which depicts command, address, response and data busses conveying information in opposite directions.

FIG. 1B depicts a detailed view of the Ring topology. The exemplary embodiment comprised of a topology comprising two rings concentric or otherwise which broadcast bus operations in opposite directions. Ring 0 (106) interconnects all the nodes (104) in the system and transfers bus operations and data in the clockwise direction. Ring 1 (107) provides the same degree of interconnect but conveys bus operations and data in the counterclockwise direction.

In accordance with an exemplary embodiment, the system contemplates a ring topology whereby each ring is comprised of a physical bus for data and another physical bus for command/address including response. In an exemplary embodiment, a bus operation is initiated from a node (104), and is simultaneously dispatched on both rings each being in opposite directions. As the command/address for a bus operation circulates around the rings, remote controllers of the non-initiating nodes begin processing. If the operation carries a store command, then the data bus conveys the data to the destination node.

The Ring protocol in accordance with an exemplary embodiment permits a multi-cycle data transfer to be initiated for a first operation while allowing a second non-data operation to initiate on the command/address bus of the same ring during subsequent data transfer cycles. As discussed herein data transfer operations traverse the shortest path between the node sourcing the data and the destination node.

A third component or operation of the Ring protocol is the response bus which conveys operational status and coherency information such as cache hit states. An exemplary embodiment of the present invention maintains overall system coherency by ensuring all responses circulate through every node. Additionally, and as they are circulated through each node the responses undergo a prioritization and merging process, described in more detail herein, which further assists in maintaining coherency.

FIG. 2 lists each of the possible cache ownership states (200) for a particular address on a node. In accordance with an exemplary embodiment, these cache ownership states are used in conjunction with more traditional cache ownership states to achieve overall coherency. When the IM (Intervention Master) bit is active for a particular address on a node, it indicates that this node was the most recent to cache in new data and receive cache ownership for that address. By definition there can no more than one node with IM=1 for a given address. Furthermore, if the cache ownership state for a given address indicates that the data is changed, it follows that the IM bit for that address must be active.

When the MC (Multi-Copy) bit is active for a particular address on a node, it indicates that one or more read-only copies of the data for this address may exist in remote caches. If the cache ownership state for a particular address on a node is Invalid, this means that the data for this address does not exist in the cache on that node. Note that for an address to be valid, either IM=1 or MC=1. Also, if an address is valid, it must be either read-only, exclusive to a central processor, or unowned. All lines held exclusive must be IM=1. Also note that valid lines with IM=0 are always unchanged.

FIG. 3a lists each of the possible responses (300) that can be propagated on a response bus of a given ring.

No Status—This response is launched on both rings whenever a new remote fetch or store command is launched.

Miss—This local response is generated if the cache ownership state at that node is found to be Invalid.

IM Hit—This local response is generated at a node if the IM bit is on.

Intermediate IM Cast Out—This intermediate response is generated to signal the return of data when the IM bit is on. As shown in FIG. 3d, ring priority logic ensures that the Intermediate IM Cast Out message is always forwarded (307) prior to forwarding of the second message IM Hit response (310). For performance reasons, the Intermediate IM Cast Out response is forwarded as quickly as possible, so as indicated by flow diagram elements 306, 307 and 308, it may also precede the forwarding of the first message IM Hit response. The direction of this response and castout data is such that it is always opposite to the direction of the incoming first message response. This facilitates data transfer with the minimum number of node hops.

Read Only Hit—This local response is generated at a node if the cache ownership state is found Read Only and the IM bit is off.

Memory Data—This local response is generated as a second message response accompanied by data at the target memory node if the local and incoming responses are some combination of Miss, Read Only Hit, or No Status.

IM Reject—This local response is generated whenever an active IM Pending condition is detected during processing of a new incoming response.

MM Reject—This local response is generated whenever an active MM Pending condition is detected during processing of a new incoming response.

Normal Completion—This local response is generated whenever processing for an LRU Write-back of aged out cache data is completed at the target memory node.

Figure 3C:
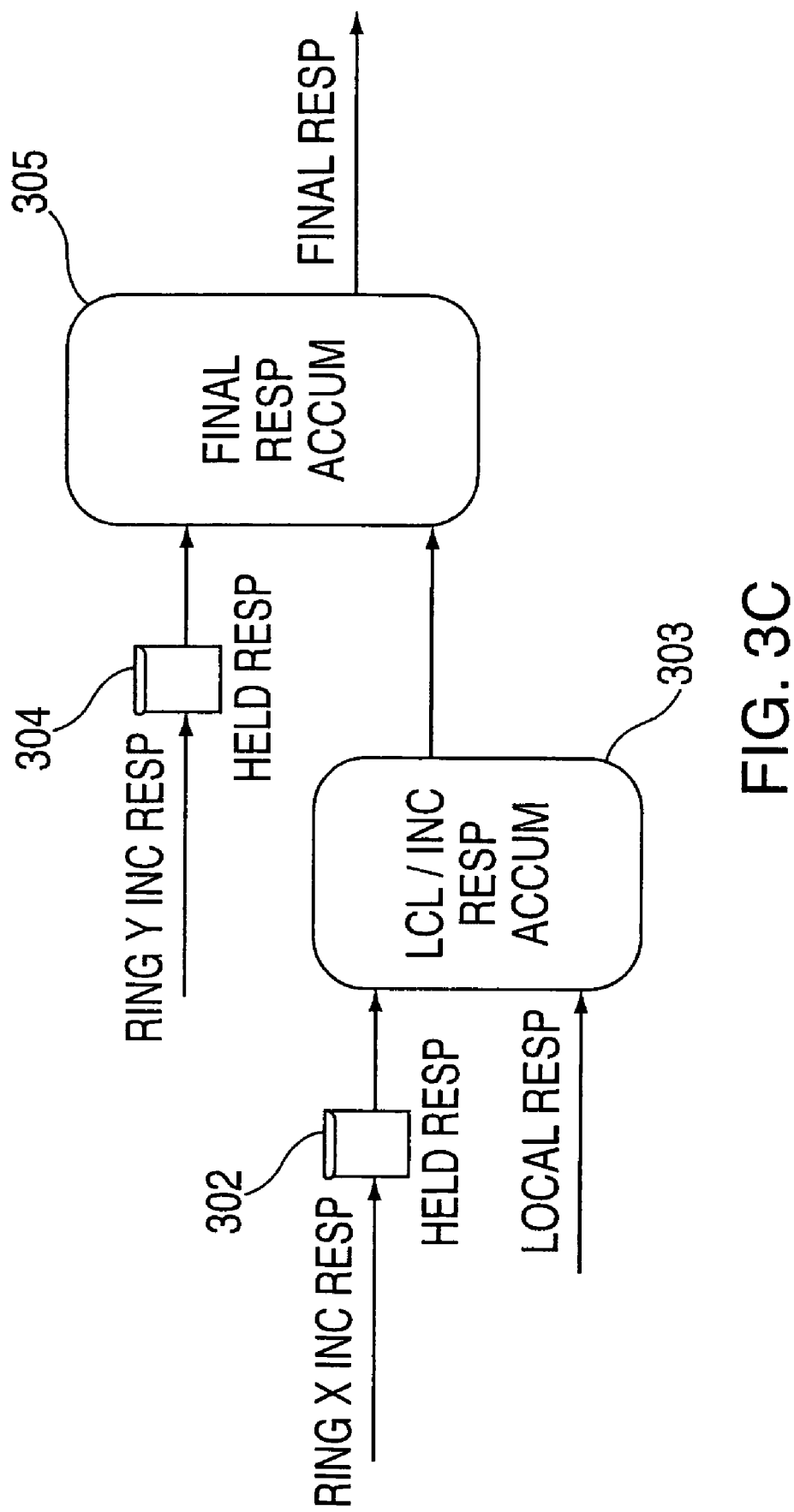
FIG. 3C illustrates the response accumulation logic within the SCE responsible for merging incoming first and second messages with locally generated responses to formulate outgoing final responses.
Figure 3D:
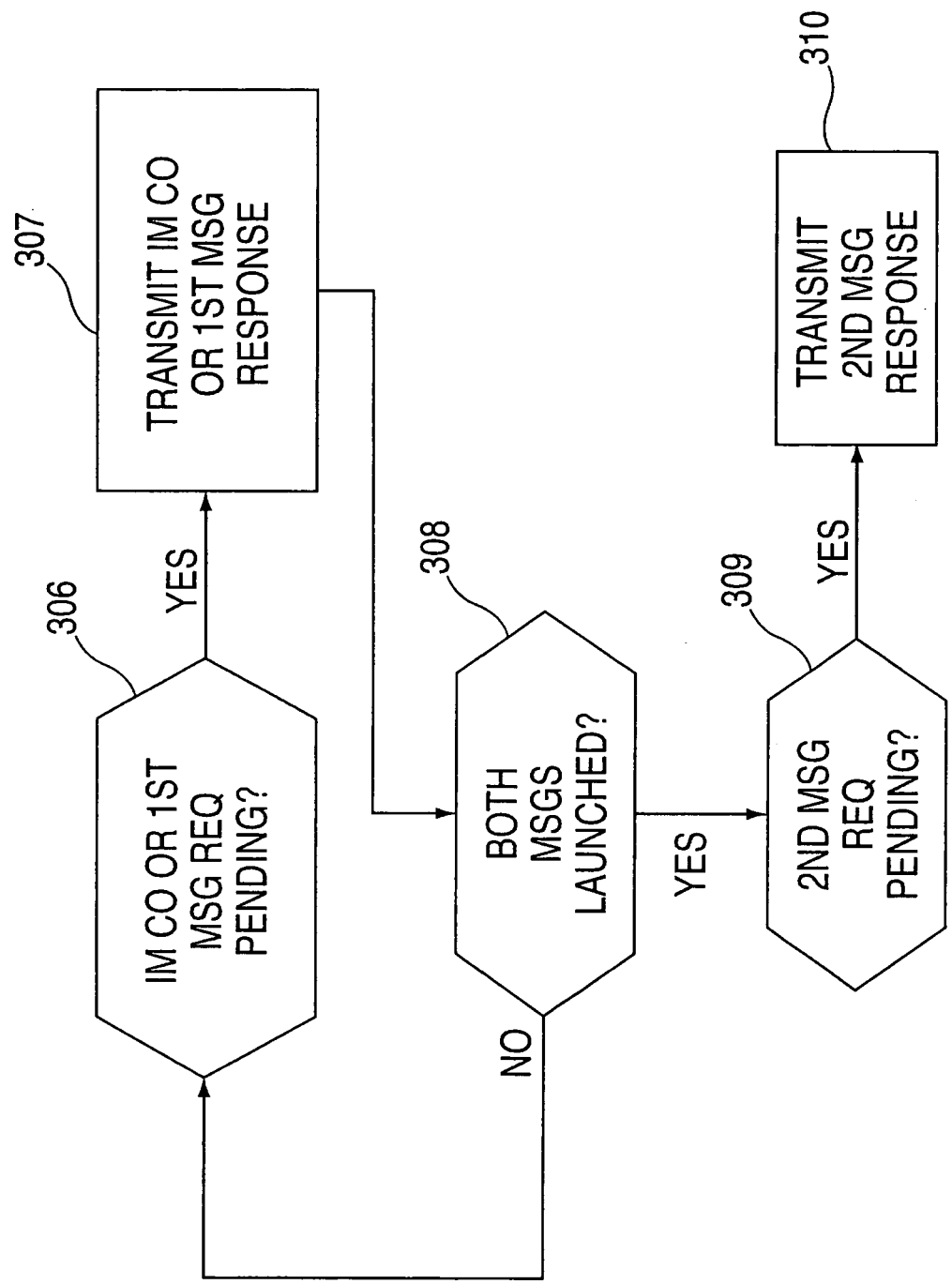
FIG. 3D illustrates a flowchart which teaches a method for ensuring Intermediate IM Cast Out and first messages are launched onto the ring topology prior to the launching of second messages.

FIG. 3b shows the ordering (301) of ring responses. This ordering is applied whenever incoming ring responses must be merged with local responses, or whenever accumulation of responses must be applied (as depicted in FIG. 3c). For Read Only, Fetch Exclusive, and LRU Write-back operations, a local IM Hit condition always results in cache data being sourced from the node. Similarly, for Read Only Invalidate operations, a local IM Hit always results in the cache ownership state being updated to Invalid at the node. This treatment of the local IM Hit condition necessitates that the IM Hit response be the highest ordered ring response. That is, once a local IM Hit condition has been observed at a node, this condition must subsequently be observed at all other nodes in order to ensure that the proper cache management actions are performed at all nodes.

Next in order behind the IM Hit response are IM and MM Reject responses. In other words, a locally generated reject response will always be reflected back to the requesting node unless an IM Hit condition exists at some other node. Next in order behind the reject responses is the Memory Data response. Since memory data can only be sourced from the target memory node when the incoming and local responses are some combination of Miss, Read Only Hit, and No Status responses, then it stands to reason that the Memory Data response must be the highest ordered response amongst those 4 types of responses. The No Status response only occurs when a ring command is initially launched onto both rings at the requesting node. Therefore, it is the lowest ordered response. The normal completion response applies only to LRU Write-back operations at the target memory node. It must be ordered ahead of the Miss response in order to facilitate notification of completion of the operation back to the requesting node.

FIG. 3c shows how local ring responses are combined with incoming ring responses to formulate the outgoing ring response. Incoming responses on both rings are captured in HELD RESP latches 302 and 304, which are located on each of the nodes in the system. HELD RESP latches 302 and 304 provide a means for combining local ring responses with incoming ring responses to formulate the outgoing ring response at all remote nodes.

An example of the operation of HELD RESP latches 302 and 304 is described as follows: If the incoming ring 0 response arrives first, it is captured in latch 302 and the incoming ring 1 response is captured in latch 304. If the incoming ring 1 response arrives first, it is captured in latch 302 and the incoming ring 0 response is captured in latch 304. Upon receipt of the incoming Ring X first message, a local response is generated. This local response is merged (303) with the held response from latch 302 using the response coherency ordering described in FIG. 3b. This result is then forwarded out on the first message. Wherein the result of this ordering is then merged (305) with the held response from latch 304—again using the response coherency ordering described in FIG. 3b. This result is then forwarded out on the second message.

In addition to merging the responses, the final response accumulation (305) also provides a means for selecting the direction of outgoing messages. For responses other than IM Cast Out messages, the outbound ring will normally be chosen based on the direction of the incoming message. For example, if the incoming first message arrives on Ring 0, it will be forwarded on Ring 0. Additionally, the second message would arrive on Ring 1, thereby causing the outgoing final response to be sent on Ring 1. In certain topologies, both messages can arrive at a node simultaneously. In this case, the present invention contemplates the use of a toggle latch to determine the direction of the outgoing message. The toggle latch is only used when both incoming messages arrive simultaneously, such that the outbound direction is indeterminate. Upon employing the latch to direct the outgoing message to a specific ring, the toggle latch is subsequently inverted such that the next time it is utilized, the other ring will be selected. This scheme ensures fairness in bus utilization.

In an example of an exemplary embodiment, the calculated average early and late data latencies on a 4-node system are 2.66 and 4 node hops respectively. This contrasts to the 3.33 and 7.33 node hops on topology A, and 4 and 6 node hops for both topologies B and C. Of course, it is contemplated that an exemplary embodiment may be used in systems with more or less than four nodes and that the aforementioned is provided to illustrate an example and is not intended to limit the exemplary embodiments discussed herein.

Figure 4A:
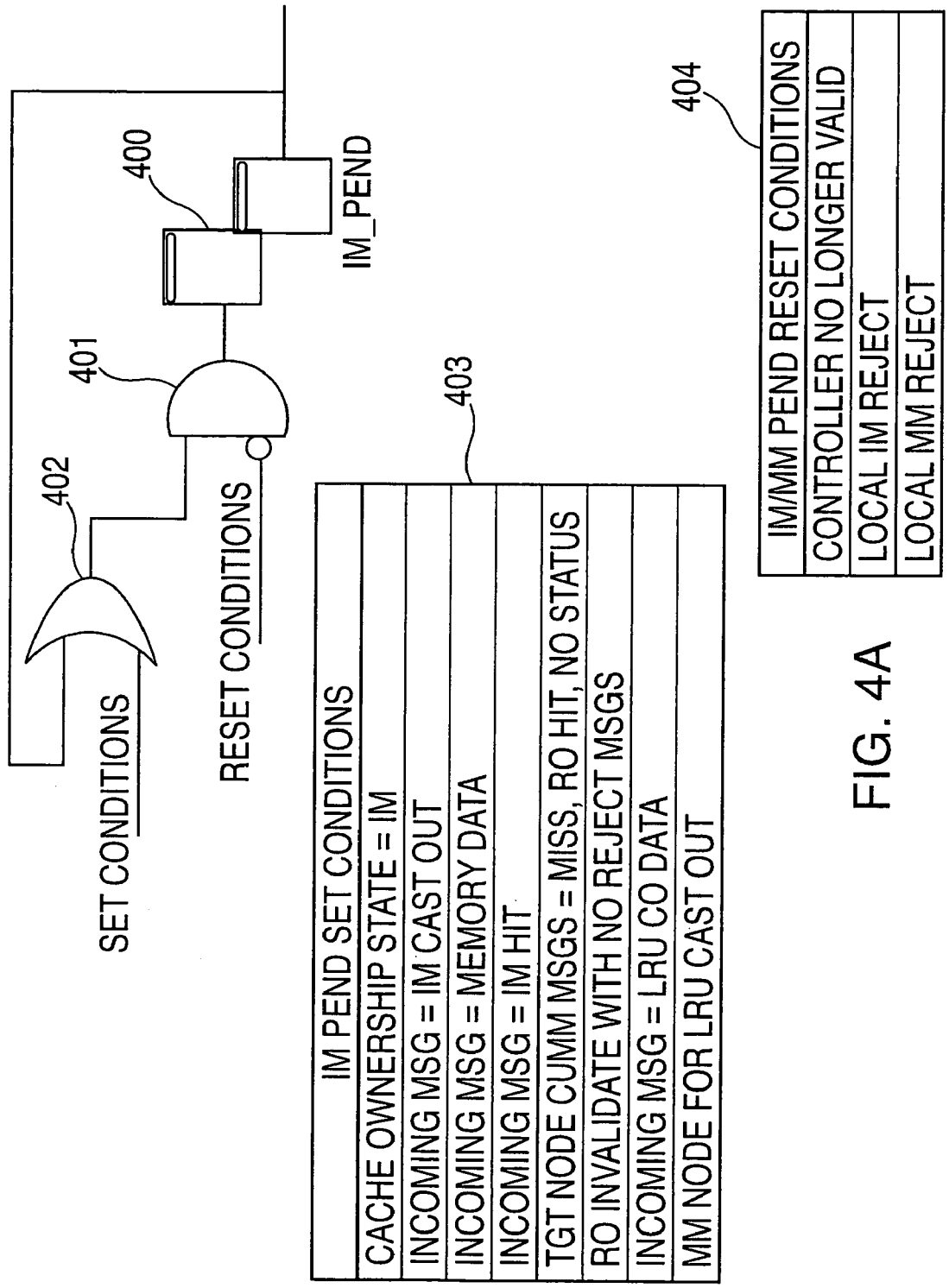
FIG. 4A illustrates a logic diagram for the Intervention Master (IM) Pending latches within the SCE which includes the logic and conditions which set and reset said latch.

FIG. 4a illustrates logic for controlling the setting and resetting of an IM_PEND latch (400). An IM_PEND latch (400) and its controlling logic are present within every local and remote controller on each of the nodes and in accordance with an exemplary embodiment is used to generate an IM Reject response for conflicting requests at the node where the IM_PEND latch (400) is set.

An example of the operation of the IM_PEND latch (400) is described as follows. As seen from the output of logic gate (401), the IM_PEND latch is reset if any of the IM_PEND reset conditions (404) is true. If none of reset conditions (404) is true, then IM_PEND latch 400 is set if the output of OR gate 402 is true. That is, if no reset conditions (404) are true, the IM_PEND latch 400 will be set if either the IM_PEND latch was set the previous cycle or if any of the IM_PEND set conditions 403 is true. For remote fetch operations, the IM_PEND set conditions (403) are a function of the local cache ownership state and the status observed on the incoming command/address busses. In general, the IM_PEND latch is set for a remote fetch operation if:

- Cache or memory data will be sourced from this node
- Cache or memory data is in process of passing through or arriving at this node (as a result of being sourced from another node)
- The cache ownership states for a Read Only Invalidate operation are actively in the process of being updated.
- IM Hit final response is in process of passing through or arriving at this node (as a result of being sourced from another node)

Figure 4B:
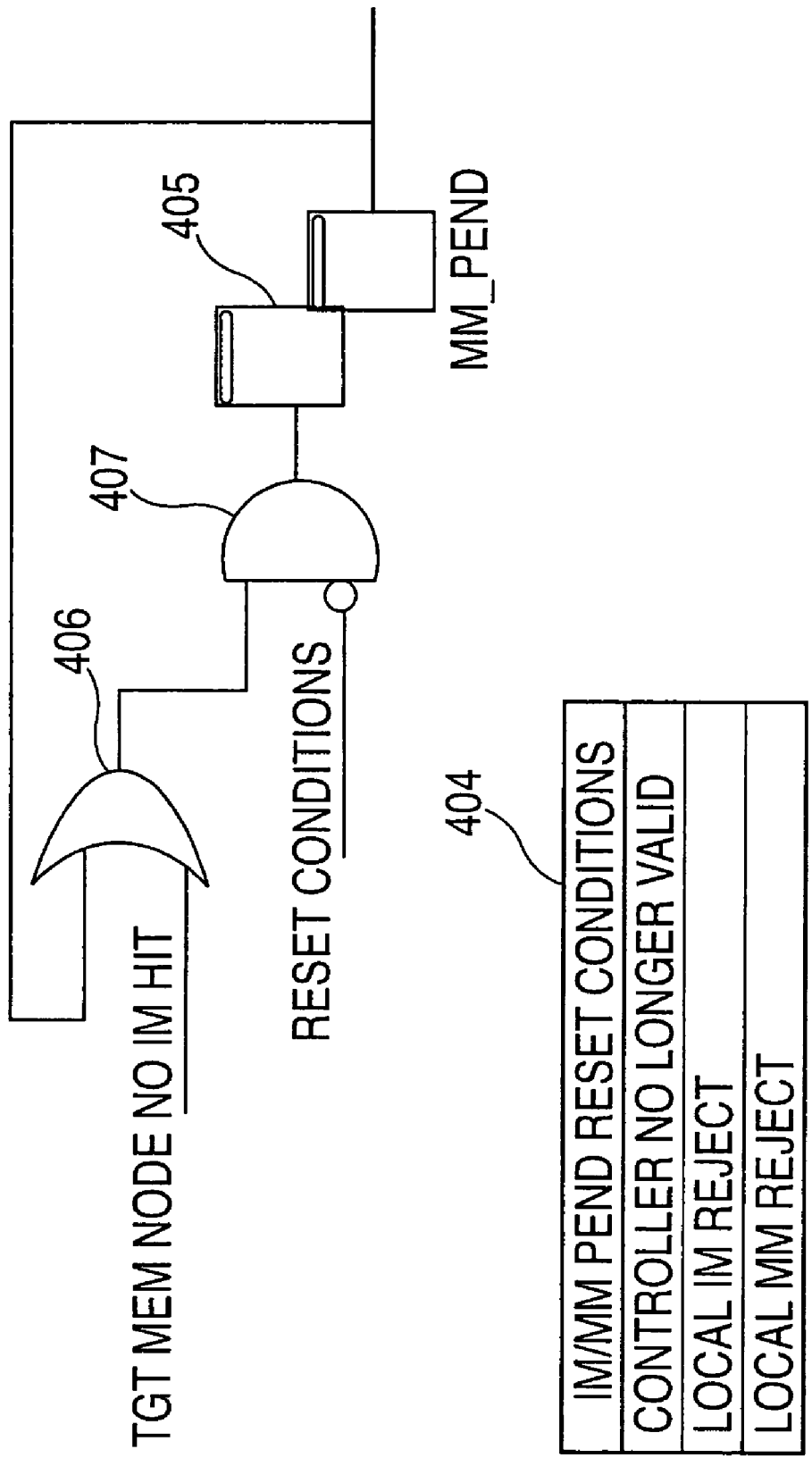
FIG. 4B illustrates a logic diagram for the Memory Master (MM) Pending latches within the SCE which includes the logic and conditions which set and reset said latch.

The reset conditions (404) for the IM_PEND latch are true if there is a local IM or MM Reject condition active as described in FIGS. 4a and 4b, or if the remote fetch or store controller operation is no longer valid (i.e. all processing for the remote fetch or store operation has been completed as signified by the departure of all messages relating to the operation).

For LRU Write-back operations, the IM_PEND set conditions (403) are active if either there is incoming LRU store data from another node or if the node is the target memory node.

With any of the IM_PEND set conditions (403) active, any subsequent conflicting requests (competing data requests) from other nodes will result in an IM Reject response being generated at the node where the IM_PEND latch (400) is set. Accordingly, the IM_PEND latch provides a means for restricting storage accesses for a given address to only one operation at a time.

FIG. 4b illustrates logic for controlling, setting and resetting of the MM_PEND latch (405). An MM_PEND latch (405) and its controlling logic are present within every local and remote controller on each of the nodes and in accordance with an exemplary embodiment the MM_PEND latch is used to generate an MM Reject response for conflicting requests at the node where the MM_PEND latch (405) is set.

An example of the operation of the MM_PEND latch (405) is described as follows. As seen from the output of logic gate 407, the MM_PEND latch is reset if any of the MM_PEND reset conditions (404) is true. If none of reset conditions (404) is true, then MM_PEND latch 405 is set if the output of OR gate 406 is true. That is, if no reset conditions (404) are true, the MM_PEND latch 405 will be set if either the MM_PEND latch was set the previous cycle or if the node is the target memory node and the cache ownership state for the address is such that the IM bit is zero. The reset conditions (404) for the MM_PEND latch are the same as described above for the IM_PEND latch. With the MM_PEND latch (405) active, any subsequent conflicting requests from other nodes will result in an MM Reject response being generated at the node where the MM_PEND latch (405) is set. Accordingly, in the absence of an active IM_PEND latch, the MM_PEND latch provides a means for restricting storage accesses for a given address to only one operation at a time.

Figure 5A:
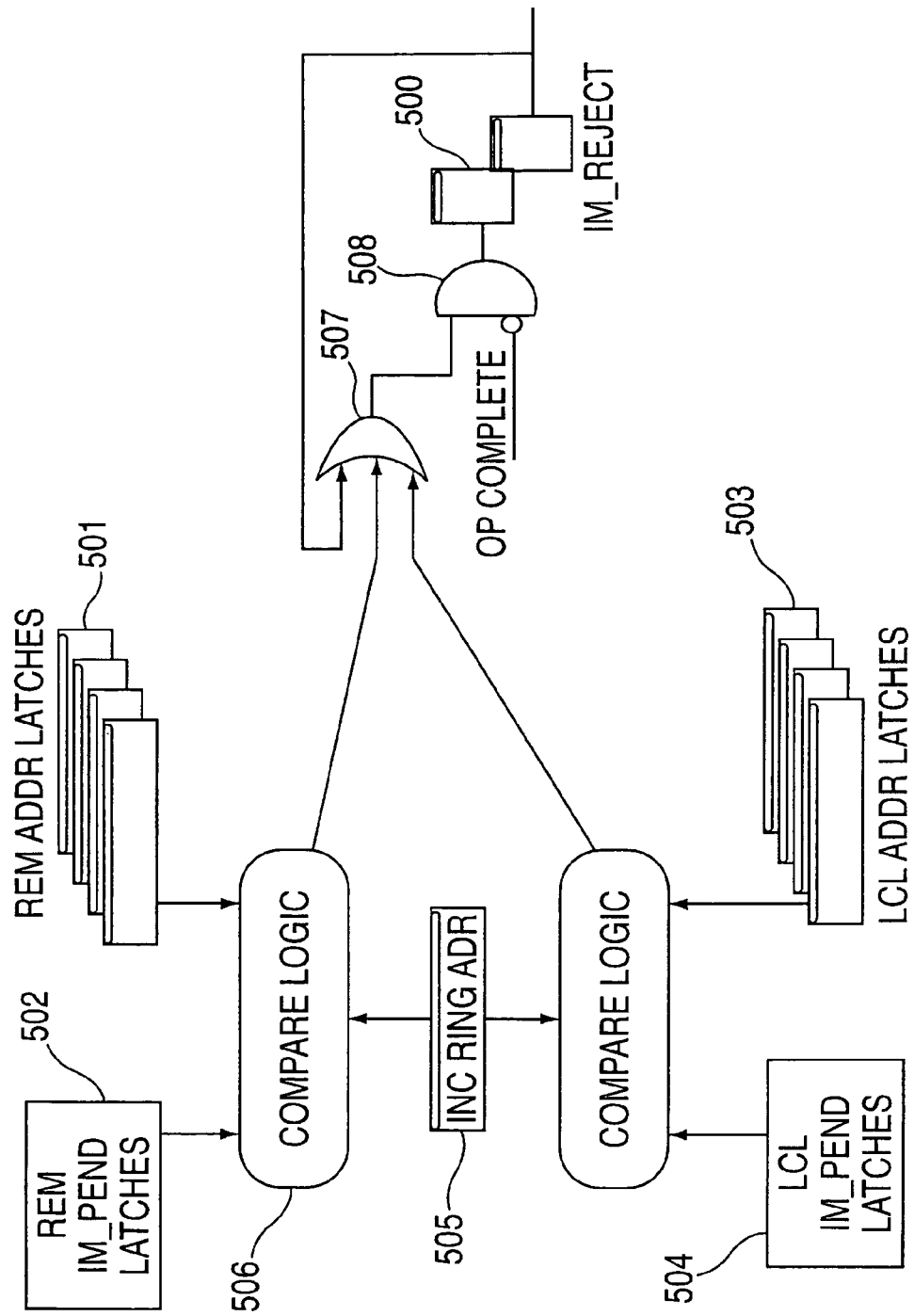
FIG. 5A illustrates the IM Pending Address Interlock mechanism within the SCE which include the address comparator for the snoop address and the IM_REJECT latch.

Turning now to FIG. 5, an exemplary embodiment of the present invention contemplates three methods of address interlocking which serve to maintain coherency in situations involving competing access to the same address. The three types of interlocks described herein are:

- IM Pending Address Interlock
- MM Pending Address Interlock
- Message Ordering Address Interlock FIG. 5a depicts the IM_REJECT latch (500) for a single remote controller along with the supporting address interlock logic. Each remote controller in each node contains an IM_REJECT latch for use in the method of providing an IM Pending Address Interlock. The purpose of the IM Pending Address interlock is to compare the address of the incoming ring operation against the addresses of all local and remote controllers. If the address equates to a local or remote controller with an active IM Pending bit, determined and provided by an IM_PEND latch (400) on any one of the nodes, then the resulting address compare ultimately sets the IM_REJECT latch (500) of the controller receiving the incoming ring operation.

The IM_REJECT latch (500) drives an IM Reject response into the Response Ordering & Merging logic, which may lead to an IM Reject response being returned to the originating requester, thereby preventing said requester from altering the cache state of the desired address. With the exception of LRU Write-back operations, all ring operations must observe any IM Reject conditions that may be detected during processing of the operation. Since LRU Write-back operations can only store changed data to memory, this means that all LRU Write-back operations can only originate from a node with IM=1. Thus the IM node serves as the single point of coherency for LRU Write-back operations, and observance of any IM Reject conditions during the processing of LRU Write-back operations by a remote store controller is not required.

In an exemplary embodiment, the remote controller's IM_REJECT latch (500) is a reset-dominant hold-type latch. The outputs of the address comparators (506) are combined through OR gate (507) with the output of the IM_REJECT latch (500) to form a holding latch. The output of OR gate (507) is fed into AND gate (508) which only allows the set or hold condition to pass through if the current operation is in progress. Once the current operation completes, the IM_REJECT latch (500) will be reset as signified by the departure of all messages relating to the operation.

In an exemplary embodiment, the same Address Compare logic (506) is used for both the local and remote controllers. The outputs of every other remote controllers' Address latches (501) and IM_PEND latches (502) are fed into the Address Comparator (506). If any of the IM_PEND latches is active, the corresponding address register is compared against the Ring Address Register (505) of the incoming ring operation for equality. Simultaneously, the outputs of all local controllers' Address latches (503) and IM_PEND latches (504) are similarly fed into the Address Comparator (506) and checked against the incoming ring operation's Address Register (505). Any match encountered, winds up setting this remote controller's IM_REJECT latch (500). Accordingly, the IM_REJECT Latch provides a means for maintaining coherency in situations involving competing access to the same address by comparing the addresses of the incoming ring operation against those of all local and remote controllers and if necessary causes an IM Reject response to be sent to the requester which prevents the requester from altering the cache state of the desired address until the operation which set the IM_PEND latch has completed.

Figure 5B:
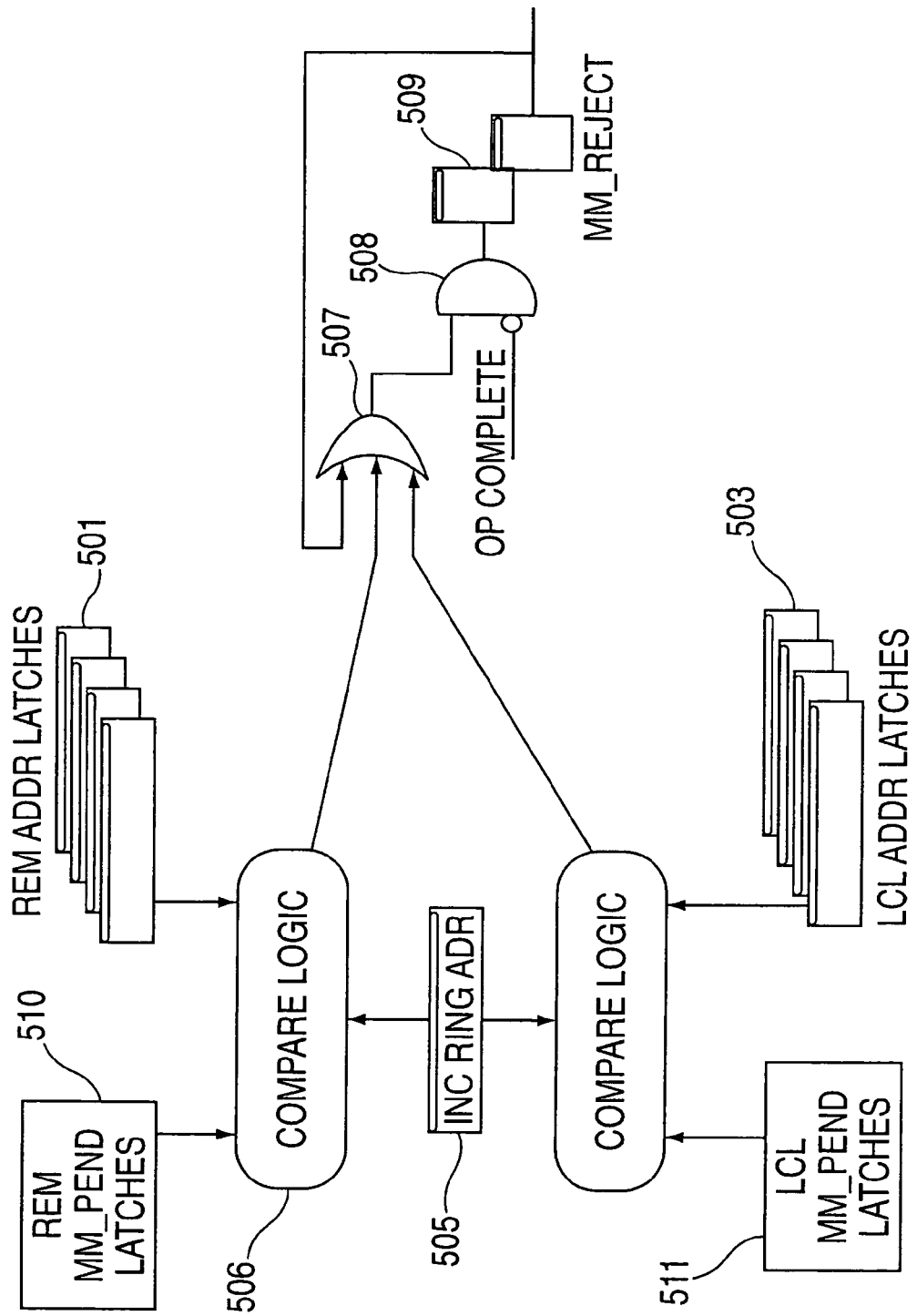
FIG. 5B illustrates the MM Pending Address Interlock mechanism within the SCE which include the address comparator for the snoop address and the MM_REJECT latch.

FIG. 5b illustrates an MM Pending Address Interlock (509) which is almost identical to the IM Pending Address Interlock.

Each remote controller in each node contains an MM_REJECT latch for use in the method of providing an MM Pending Address Interlock. The purpose of the MM Pending Address interlock is to compare the address of the incoming ring operation against the addresses of all local and remote controllers. If the address equates to a local or remote controller with an active MM Pending bit, determined and provided by an MM_PEND latch (405) on the target memory node, then the resulting address compare ultimately sets the MM_REJECT latch (509) of the controller receiving the incoming ring operation.

The MM_REJECT latch (509) is also reset-dominant with the latch resetting when the operation completes. Once the operation initiates, then OR gate (507) drives either the comparator results or the feedback path of the MM_REJECT latch (509) to set the latch. As with the IM_REJECT latch (500), the OR gate (507) is fed by the output of the Address Comparators (506) which employs copies of common Exclusive-OR logic used in the IM Pending Address Interlock. As shown in FIG. 5b, the same remote (501) and local (503) address registers are compared against the Ring Address Register (505) of the incoming ring operation.

However, in this case the compares are gated with the remote controllers' (510) and local controllers' (511) MM_PEND latches instead of the IM_PEND latches. Thus, any other remote controller with an active MM_PEND latch and a matching address will activate the MM_REJECT latch of the controller receiving the incoming ring operation. Assuming no locally detected IM Reject exists, the MM_REJECT latch (511) drives an MM Reject response into the Response Ordering & Merging logic, which may lead to an MM Reject response being returned to the originating requester, thereby preventing said requester from altering the cache state of the desired address. With the exception of LRU Write-back operations, all ring operations must observe any MM Reject conditions that may be detected during processing of the operation. Since LRU Write-back operations can only store changed data to memory, this means that all LRU Write-back operations can only originate from a node with IM=1. Thus the IM node serves as the single point of coherency for LRU Write-back operations, and observance of any MM Reject conditions during the processing of LRU Write-back operations by a remote store controller is not required.

Accordingly, the MM_REJECT Latch provides a means for maintaining coherency in situations involving competing access to the same address by comparing the addresses of the incoming ring operation against those of all local and remote controllers and if necessary causes an MM Reject response to be sent to the requester which prevents the requester from altering the cache state of the desired address until the operation which set the MM_PEND latch has completed.

Figure 5C:
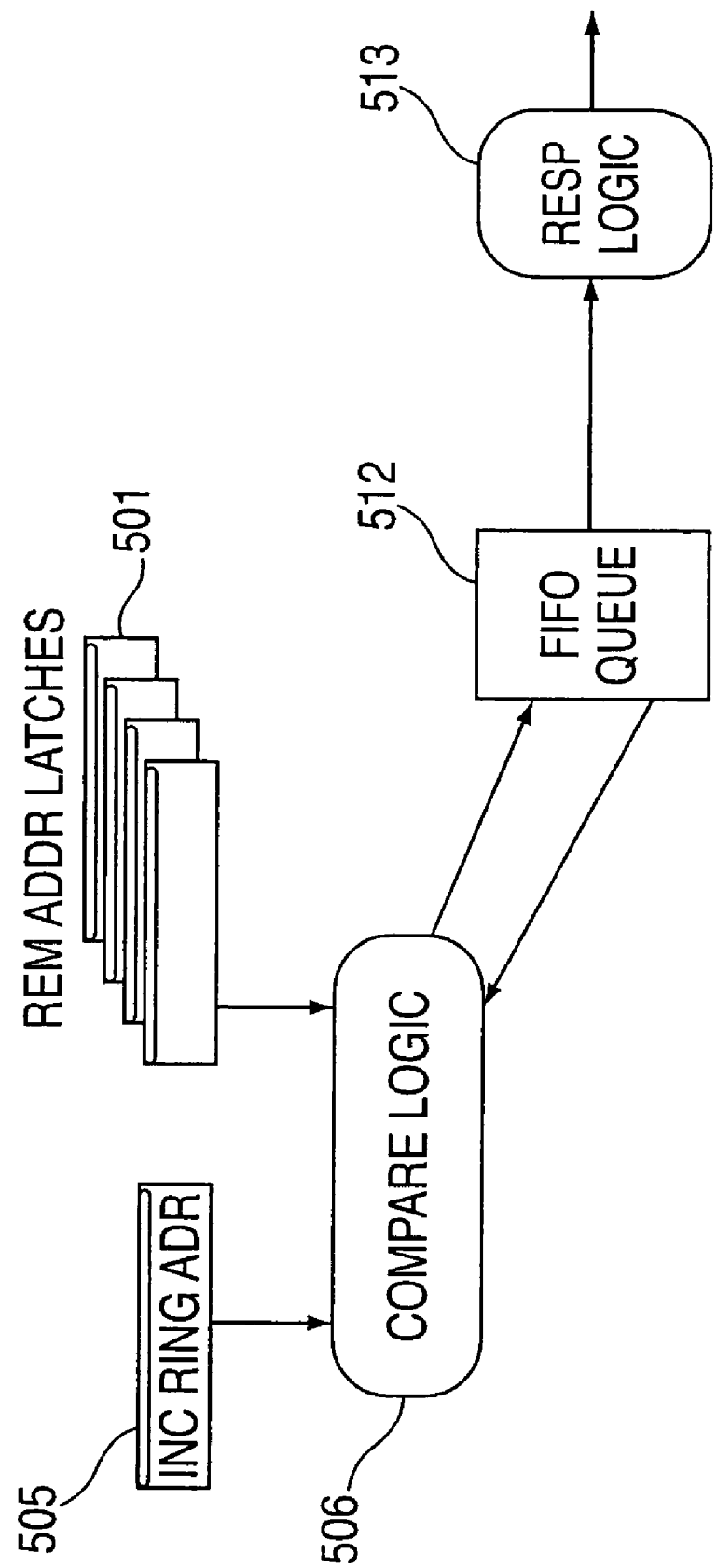
FIG. 5C illustrates the Message Ordering Address Interlock mechanism within the SCE which includes the address comparator for the snoop address and the First-In/First-Out (FIFO) Queue.

An exemplary embodiment also employs a further means of maintaining system level coherency by introducing a third type of interlock specifically designed to ensure that a plurality of first messages targeting the same address leave a node in the same order in which they enter the node. This first-in first-out (FIFO) order is maintained regardless of the order in which the incoming operations are actually processed. FIG. 5c depicts the Message Ordering Address Interlock logic in which all the Remote Address Registers (501) are compared to the Ring Address Register (505) of the incoming operation. The comparison is done with the Address Compare logic (506) which employs copies of the same Exclusive-OR logic used in the previous two interlock mechanisms.

Also, as was the case for the previous two interlock mechanisms, LRU Write-back operations are not required to observe the Message Ordering Address Interlock due to the fact that the IM node already serves as the single point of coherency for all LRU Write-back operations.

Unlike the previous interlocks, this compare does not require any remote controller to have an IM or MM Pending status. Instead, it seeks to find a simple address match in an effort to construct a FIFO queue for incoming messages with common addresses. The output of the Address Comparator (506) feeds the FIFO Queue (512). This logic uses unique identification codes for each remote controller to construct a linked-list. The top of the list indicates the ID of the controller who received the first message with the common address. The second entry in the list indicates the ID of the second controller with a matching address, and so on.

The FIFO Queue (512) is used to drive the Outbound Response Logic (513) which receives requests from the remote controllers to outgate messages onto the ring topology. The Outbound Response Logic (513) uses the results of the FIFO Queue (512) to properly order the controllers' requests and ensure that the controller whose ID is at the top of the FIFO Queue outgates its message before another controller with a matching address. To facilitate performance, an exemplary embodiment permits remote controllers whose addresses do not match any other controllers to interject messages onto the ring in any order with respect to the FIFO Queue. Furthermore, an exemplary embodiment of the present invention also permits a multiplicity of addresses to be managed simultaneously thereby allowing several groups of remote controllers to process data with matching addresses. Since the FIFO Queue (512) tracks each remote controller's address individually, it is capable of constructing as many linked-lists as needed to allow any combination or grouping of controllers with matching addresses.

FIG. 6 consists of a list of the commands (600) that can be launched onto either ring. The Read Only Fetch, Exclusive Fetch, and Read Only Invalidate are fetch type commands, and the LRU Write-back command is a store type command. With the exception of the Read Only Invalidate command, all commands result in data transfer between source and destination nodes. The Read Only Invalidate command is performed for the purpose of obtaining exclusivity of an address at the requesting node when the initial cache ownership state in the requesting node is MC=1. In this case, data transfer between nodes is not performed since the requesting node already has a copy of the data.

FIG. 7 lists the priority (700) for arbitrating amongst the six possible ring request types. The priority list is as follows: 1) Data Flow Thru Ops; 2) Remote Data Requests; 3) Local Data Requests; 4) Local Non-Data Requests; 5) First Message Remote Requests; and 6) Second Message Remote Requests. The ring request priority scheme can be summarized as follows:

Data requests are highest priority. This allows for the best utilization of the command/address bus since multiple non-data requests can be launched while the data bus is busy. This is because data requests require the use of the data bus for many more cycles than non-data requests use of the command/address bus.

Local requests are higher priority than first or second message remote requests. The motivation for this is to prevent lock-outs. Local requests require use of both rings, while first and second message remote requests require use of only one ring. Also, remote requests are more likely to occur per unit time than local requests since there are 3 remote nodes for every local node. Thus, it is important to prevent situations whereby the more frequent and less restrictive first and second message remote requests could potentially lockout the less frequent and more restrictive local requests.

First message remote requests are higher priority than second message remote requests. The motivation for this is so that the cache ownership results for any remote operation will be made visible to all other nodes as quickly as possible.

FIGS. 8a thru 8e collectively illustrate an example of contention between two concurrent fetch operations on the ring. It is, of course, understood that numerous operations of the exemplary embodiments are contemplated. Thus, the following is but an example of operations of exemplary embodiments and the present invention is not intended to be limited to the above example. It is assumed that both operations are targeting the same address. The initial cache ownership states in this example are as follows:

N0 (800) is Invalid
N1 (801) is Read Only, IM=0, MC=1
N2 (802) is Invalid
N3 (803) is Read Only, IM=1, MC=1

N3 (803) is the node which holds a cached copy of the data marked as IM=1, and therefore contains the cache token acting as the system level coherency point for which competing operations to the same address arbitrate for continuation of processing. N2 (802) is the target memory node which holds the memory data for the requested address, and therefore contains the memory token. In the absence of a cache token, the memory token serves as the system level coherency point for which competing operations to the same address arbitrate for continuation of processing. The arbitration result from any cache-based system level coherency point overrides the arbitration result from any memory-based system level coherency point.

FIG. 8a shows a Fetch Exclusive operation being launched from N0 (800). At the same time, a Read Only Invalidate operation is launched from N1 (801). For both operations, the ring launch for the Fetch Exclusive (804) and for the Read Only Invalidate (805) is performed simultaneously on both rings.

Figure 8B:
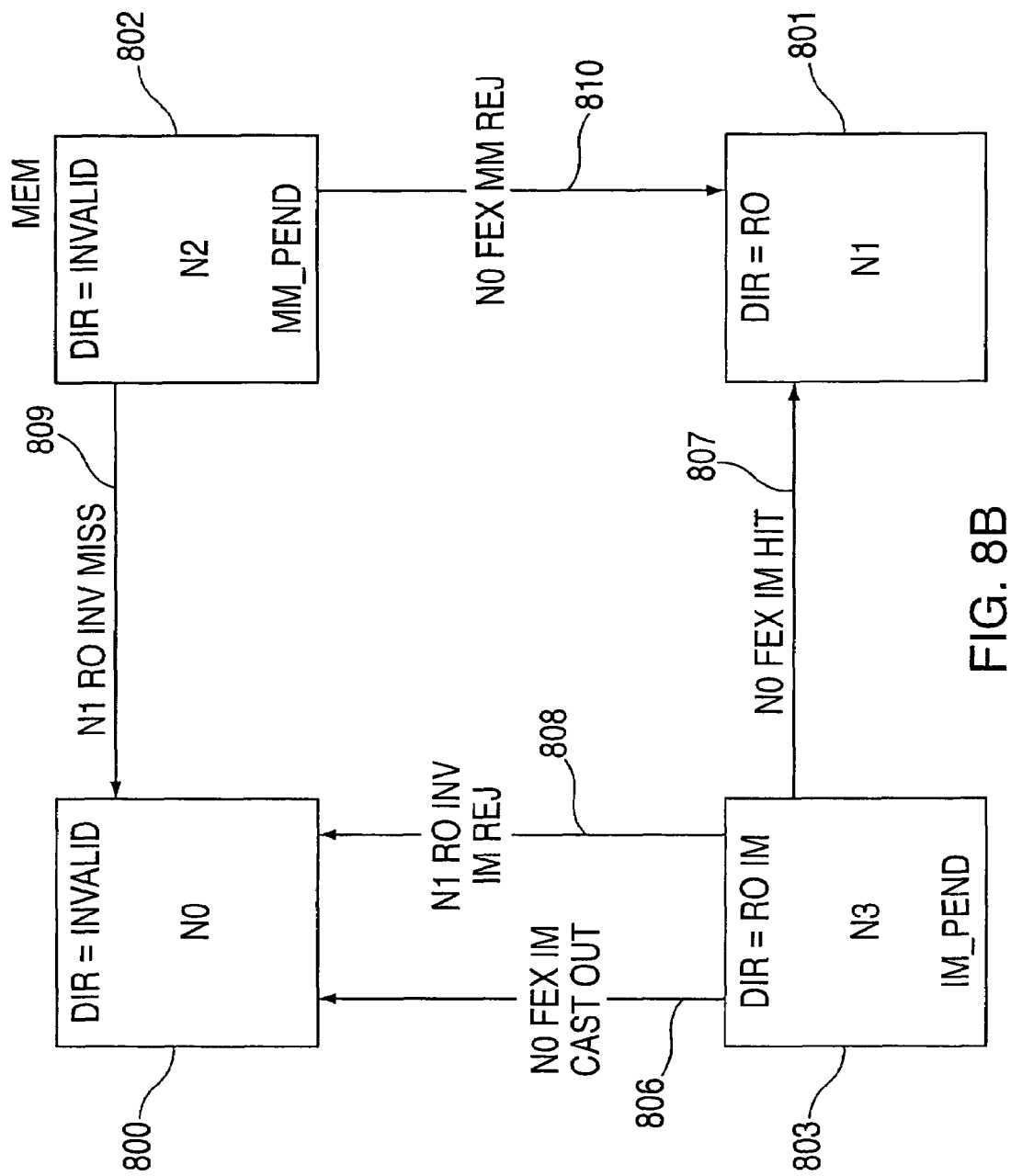

FIG. 8b assumes that the Fetch Exclusive operation arrived first on N3 (803) via the incoming ring 1 (counter-clockwise) command/address bus. This results in the following actions on behalf of the Fetch Exclusive operation:

Setting of IM Pending on N3 (803)
Sourcing of Intermediate IM CO response (806) and fetch data on the ring 0 command/address bus back to N0.
Generation of IM Hit response (807) on ring 1 command/address bus Meanwhile, at target memory node N2 (802), the incoming Fetch Exclusive operation on the ring 0 command/address bus results in an outgoing MM Reject response on ring 0 due to the Read Only Invalidate operation arriving first on ring 1 and setting MM Pending on N2(802). An outgoing Miss response (809) is generated for the Read Only Invalidate operation at N2(802) as a result of the Invalid cache ownership state observed at this node. On node 3 (803), the incoming Read Only Invalidate operation on the ring 0 command/address bus results in an outgoing IM Reject response on ring 0 due to the Fetch Exclusive operation arriving first on ring 1 and setting IM Pending on N3 (803).

Figure 8C:
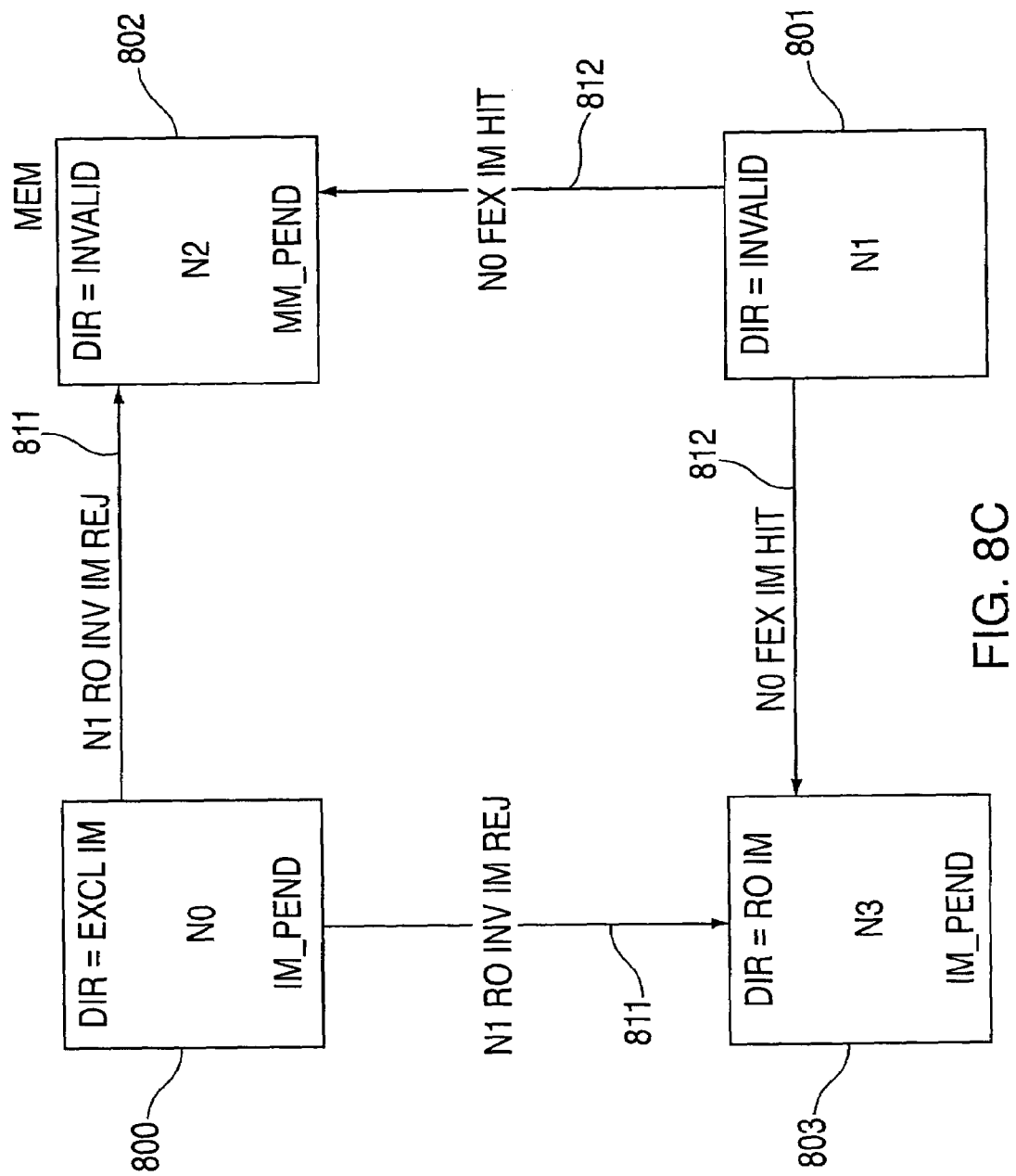

FIG. 8c shows the results of response accumulation at Node 0 (800) and Node 1 (801), and also shows the setting of IM Pending on N0(800) as a result of the incoming IM CO message (806) being received on this node. At node 1, incoming responses from the Fetch Exclusive operation (ring 0 MM Reject, ring 1 IM Hit) are processed and accumulated using the response coherency ordering scheme depicted in FIG. 3b. This results in an outgoing IM Hit response (812) being launched in both ring directions back towards originating node N0 (800). The cache ownership state at node 1(801) is also updated to Invalid since the accumulated IM Hit response at this node necessitates that the Read Only state be removed since N0 (800) will ultimately obtain exclusive ownership of this address. At N0 (800), incoming responses from the Read Only Invalidate operation (ring 0 IM Reject, ring 1 Miss) are also processed and accumulated. This results in outgoing IM Reject response (811) being launched in both ring directions back towards the originating node N1 (801).

Figure 8D:
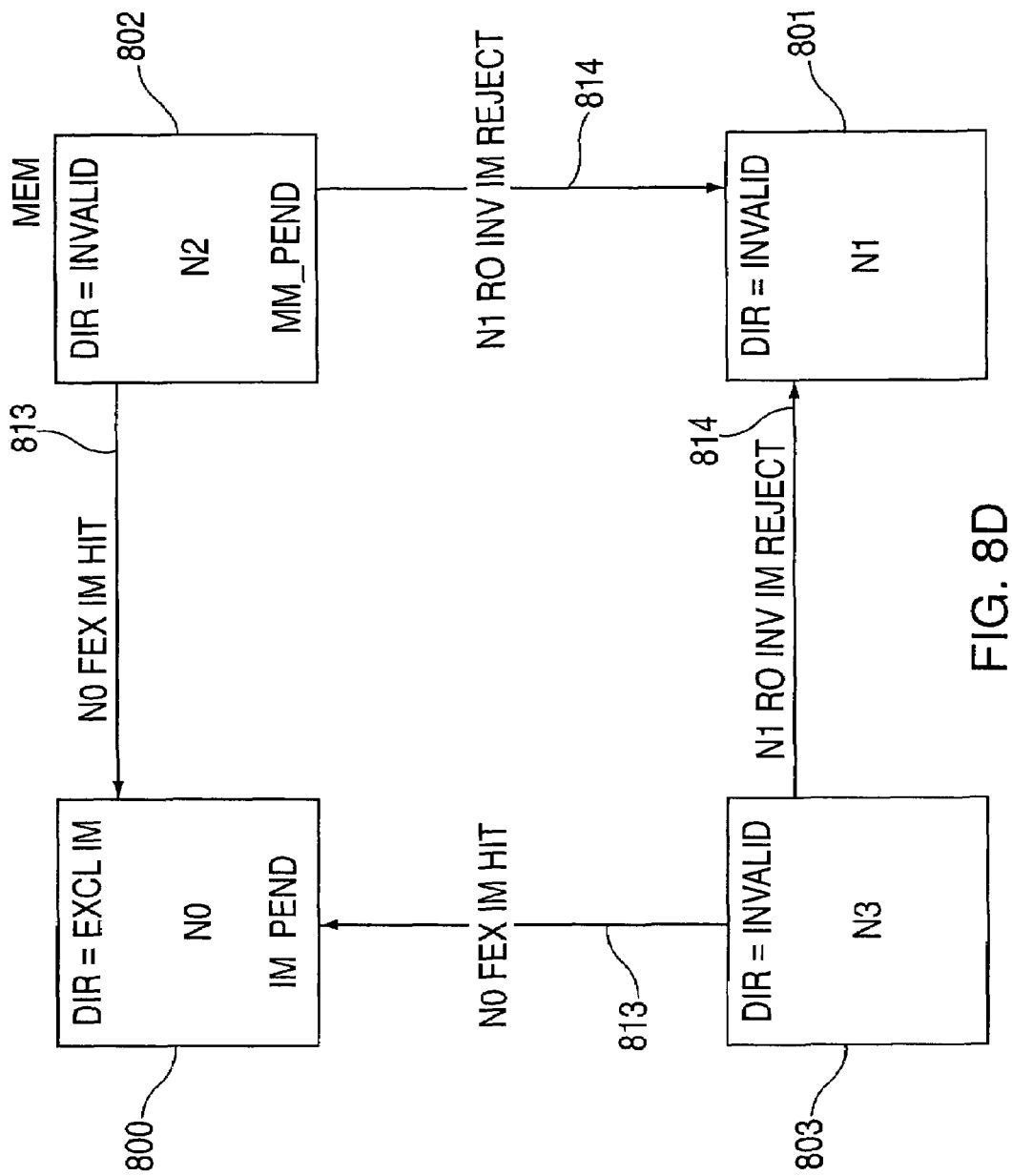

FIG. 8d shows the results of processing of second messages for both ring operations at intermediate nodes N2 (802) and N3(803).

For the Fetch Exclusive command, the incoming second message from the Fetch Exclusive operation (ring 1 IM Hit) is received on N2 (802) and forwarded (813) on same ring back to originating node N0 (800). On N3 (803), the incoming second message from the Fetch Exclusive operation (ring 0 IM Hit) is received and forwarded on same ring (813) back to originating node N0. The incoming IM Hit second message on N3 (803) necessitates that the cache ownership state be updated to Invalid since N0(800) will ultimately obtain exclusive ownership of this address. For the Read Only Invalidate command, the incoming second message (ring 0 IM Reject) is received on N2 (802) and forwarded (814) on same ring back to originating node N1 (801). Also, on N3 (803), incoming second message (ring 1 IM Reject) is received and forwarded on same ring (814) back to originating node N1 (801).

Figure 8E:
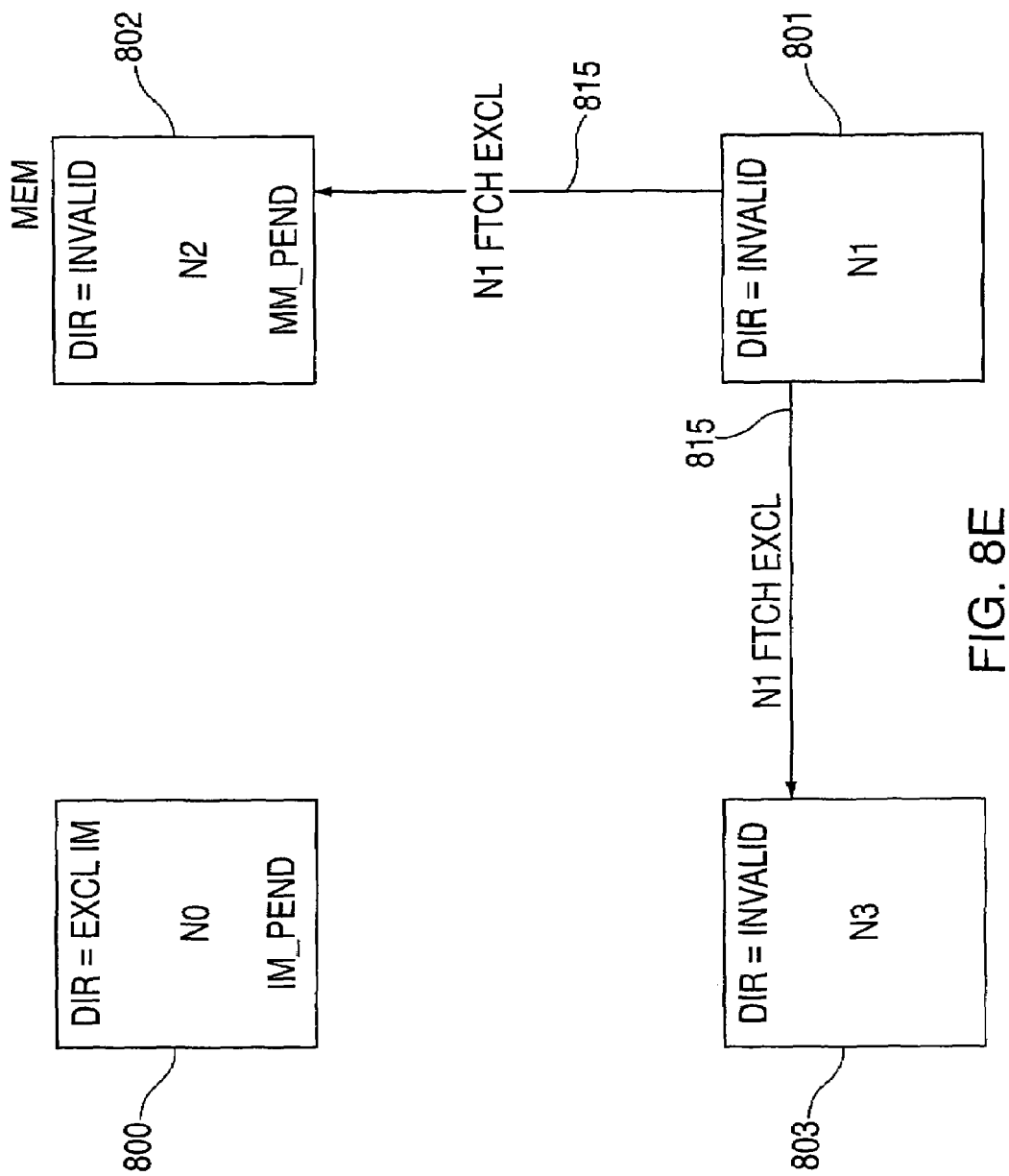

FIG. 8e shows the results of incoming second messages being received at the originating nodes. At N0 (800), the incoming IM Hit message for the Fetch Exclusive command is received on both rings. This results in the N0 cache ownership state being updated to IM, Exclusive to CP. At N1 (801), the incoming IM Reject message is received on both rings for the Read Only Invalidate command. The command is then re-launched on the ring as a Fetch Exclusive command due to the cache ownership state now being Invalid at N1 (801).

Exemplary embodiments disclosed herein are contemplated for use with topologies for shared memory computer systems, an example of one topology is disclosed in related U.S. patent application Ser. No. 10/436,378, entitled: TOPOLOGY FOR SHARED MEMORY COMPUTER SYSTEM filed May 12, 2003.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It should also be noted that the terms "first", "second", and "third" and the like may be used herein to modify elements performing similar and/or analogous functions. These modifiers do not imply a spatial, sequential, or hierarchical order to the modified elements unless specifically stated.

What is claimed is:

1. A shared memory symmetrical processing system, comprising:
   a plurality of nodes each having a system control element for routing internodal communications;
   a first ring and a second ring for interconnecting said plurality of nodes, wherein data in said first ring flows in opposite directions with respect to said second ring; and
   a receiver for receiving a plurality of incoming messages via said first or said second ring and merging a plurality of incoming message responses with a local outgoing message response to provide a merged response;
   wherein each of said plurality of nodes comprising any combination of the following: at least one processor; cache memory; a plurality of I/O adapters; and main memory; and
   wherein said system control element comprises a plurality of controllers for maintaining coherency in the system.

2. The shared memory symmetrical processing system as in claim 1, wherein said system control element of each of said plurality of nodes comprises a pair of latches for determining which response is to be generated on said first ring and said second ring, wherein said response indicates that requested data exists in one of two states which may prevent an operation from altering the state of said requested data, said pair of latches are configured to compare the address of an incoming operation to the address of local and remote controllers on each of said plurality of nodes.

3. The shared memory symmetrical processing system as in claim 2, wherein each of said pair of latches receive a comparison between a first plurality of local address latches and the data address in the incoming operation, and a comparison between a second plurality of remote address latches and the data address in the incoming operation for determining whether to generate said response.

4. The shared memory symmetrical processing system as in claim 3, wherein said response is either an IM Reject response or an MM Reject response.

5. The shared memory symmetrical processing system as in claim 4, further comprising a FIFO Queue for driving outbound response logic on said first ring or said second ring.

* * * * *